United States Patent [19]

Freisleben

[11] Patent Number: 5,234,221
[45] Date of Patent: Aug. 10, 1993

[54] ELASTOMER SEAL

[75] Inventor: Walter Freisleben, Ebersbach, Fed. Rep. of Germany

[73] Assignee: Richard Hirschmann Radiotechnisches Werk, Fed. Rep. of Germany

[21] Appl. No.: 236,037

[22] Filed: Feb. 22, 1990

Related U.S. Application Data

[63] Continuation of Ser. No. 172,478, Mar. 28, 1988, abandoned.

[30] Foreign Application Priority Data

Mar. 26, 1987 [DE] Fed. Rep. of Germany ... 8704509[U]

[51] Int. Cl.$^5$ ............................................. F16J 15/10
[52] U.S. Cl. ....................................... 277/1; 277/12; 277/207 R; 174/92; 439/548; 439/556; 439/559
[58] Field of Search ............. 277/1, 12, 207 R, 207 A, 277/211; 439/548, 556, 559; 138/92, 94; 285/197, 373; 174/92; 137/318; 248/49; 251/146

[56] References Cited

U.S. PATENT DOCUMENTS

| | | | |
|---|---|---|---|
| 480,643 | 8/1892 | Welsh | 277/207 |
| 1,245,002 | 10/1917 | Mastin | 277/207 |
| 1,616,390 | 2/1927 | Powell | 285/197 |
| 1,969,795 | 8/1934 | Hewitt | 277/207 |
| 2,660,192 | 11/1953 | Hunter | 251/146 X |
| 3,026,076 | 3/1962 | Bender | 248/49 |
| 3,198,206 | 8/1965 | O'Brien | 137/318 X |
| 3,218,093 | 11/1965 | Carlson | 285/197 |
| 3,363,650 | 1/1968 | Scaramucci | 277/207 X |
| 3,402,946 | 9/1968 | Dedian | 285/373 X |
| 3,428,075 | 2/1969 | Wagner | 285/197 X |
| 3,480,252 | 11/1969 | Simons | 251/146 |
| 3,565,468 | 2/1971 | Garrett | 285/373 |
| 3,856,208 | 12/1974 | Naftaly | 285/197 X |
| 3,871,034 | 3/1975 | Weigel | 277/207 R X |
| 4,254,960 | 3/1981 | Jelinek | 277/207 R X |
| 4,675,779 | 6/1987 | Neuwirth | 439/271 X |
| 4,768,813 | 9/1988 | Timmons | 285/197 X |

FOREIGN PATENT DOCUMENTS

| | | | |
|---|---|---|---|
| 878356 | 8/1971 | Canada | 251/146 |
| 563173 | 11/1932 | Fed. Rep. of Germany | 248/49 |
| 2300288 | 9/1976 | France | 137/318 |
| 7002538 | 8/1970 | Netherlands | 285/197 |
| 150255 | 9/1920 | United Kingdom . | |
| 248052 | 2/1926 | United Kingdom | 439/559 |
| 1388894 | 3/1975 | United Kingdom | 277/207 R |

Primary Examiner—Thomas B. Will
Assistant Examiner—James K. Folker
Attorney, Agent, or Firm—Robert J. Koch

[57] ABSTRACT

An elastomer seal is described which is useful for forming a sealed, flat mounting surface on a curved housing. The elastomer seal has a flat sealing face opposite a curved sealing surface. An angled transition surface is adjacent to the curved sealing surface forming a bevel. The bevel assists the seal in properly deforming so that a sealing area is formed across the curved housing. This seal provides peripheral and central contact so that the distribution of compressed seal material is well spread over the surface of the sealed area. The elastomer seal is able to effectively seal housings with radii of curvature from 1 to 6.4 times the curvature radius of the curved sealing surface.

24 Claims, 4 Drawing Sheets

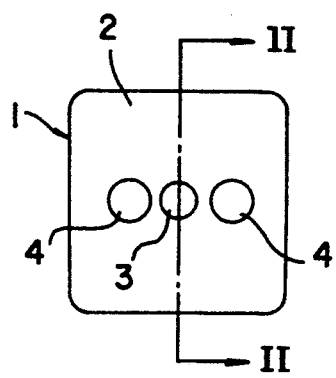
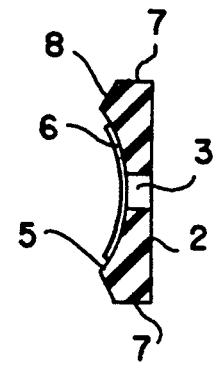
Fig.1　　　　　　　　Fig.2
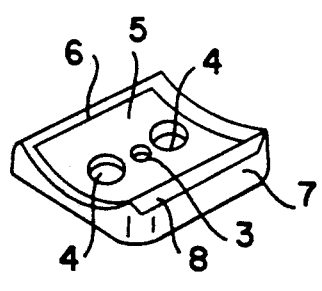
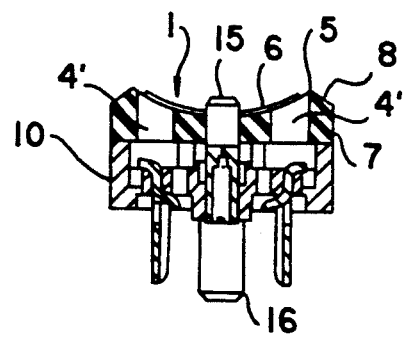
Fig.3　　　　　　　　Fig.4

Fig.8
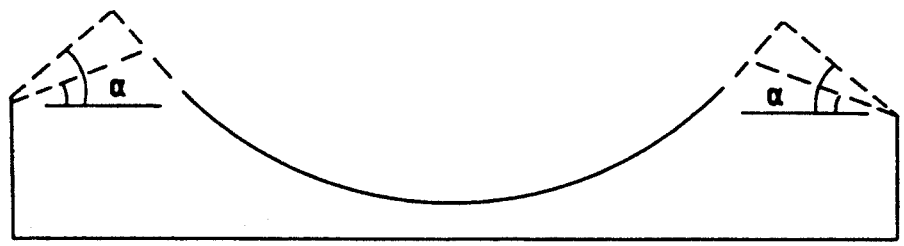
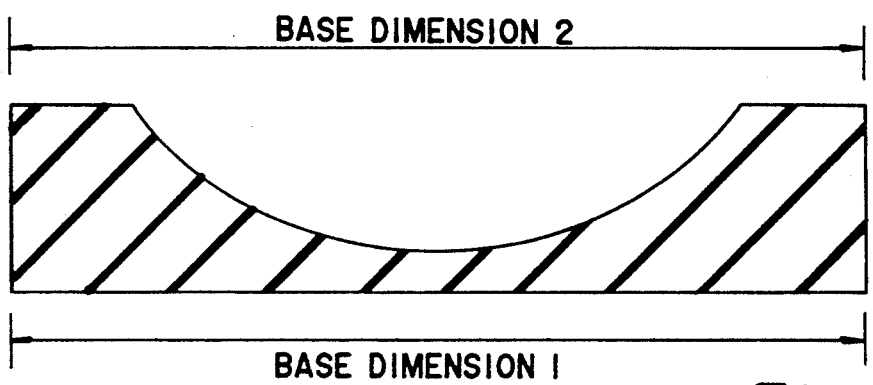
Fig.9
PRIOR ART
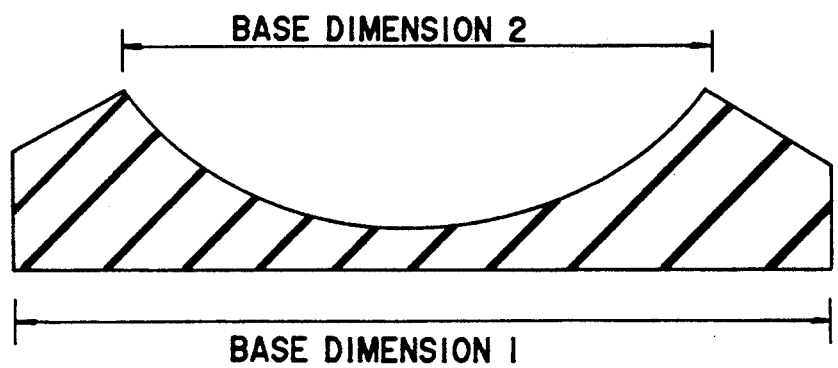
Fig.10

ELASTOMER SEAL

This application is a continuation of application Ser. No. 07/172,478 filed Mar. 28, 1988, abandoned.

The innovation concerns an elastomeric seal with flat and cylindrical sealing surfaces for transforming a cylindrical surface into a sealable flat surface for mounting.

BACKGROUND OF THE INVENTION

Flat/curved seals are used for mounting plugs and other structural elements having cylindrical housings to a flat contact surface. For example, flat/curved seals may be used for mounting manometers, magnetic valves, magnetic coils, etc. which require a sealed connection with electrical line or other passages. This type of mounting condition is frequently encountered in control systems using hydraulic and similar connections.

Previous seals have required a unique part for each housing diameter. The radius of the curved sealing surface had to coincide with the radius of the curved surface to be sealed for proper sealing to exist. In other words, each cylinder surface required its own, individual, seal.

Individual seals require extensive manufacturing expenditures. For every seal with a different radius, a different shaping tool must be prepared and used. The production costs of such unique seals are further increased because the number of seals manufactured is usually quite small.

In addition, a large number of seals must be maintained in inventory, both by the manufacturer and the customers using them. High inventory requirements considerably increase the complexity and cost of storage.

SUMMARY OF THE INVENTION

It is therefore an objective of the present invention to provide an elastomer seal that may be used for a range of cylinder radii with good seal integrity.

This objective is attained according to the invention by making the base dimension of the cylindrical sealing surface smaller than the base dimension of the flat sealing surface.

Conventional seals (expressed in a simplified manner) have a rectangular cross section wherein one of the two large rectangular surfaces comprises a curved or cylindrical surface. The curved surface radius corresponds to the radius of the cylinder for which the seal is intended. In particular, the lateral surfaces are perpendicular to the flat sealing surface and extend to the edge of the cylindrical sealing surface in a direction parallel to the flat surface of the base. This leaves a relatively large and thick elastomeric mass at the edge of the cylindrical sealing surface. By extensive investigations, the inventor determined that the relatively thick lateral mass on the side of the cylindrical sealing surface is responsible for inhibiting the compression of the elastomer seal at these locations and resulting in a slight, inefficient sealing effect. If the radius of the curved sealing surface is not essentially equal to the radius of the cylinder housing, this inefficient seal is made even worse.

The inventor has found that the compression and sealing effects are significantly better if the elastomer mass is thinner at the outer areas of the cylindrical sealing surface. This is obtained according to the invention by using base dimensions for the cylindrical sealing surface which are smaller than the base dimensions for the flat sealing surface.

The elastomer seal according to the invention generates a secure and satisfactory seal by using a radius for the cylindrical sealing surface which is equal to or smaller than the radius of the housing for which the elastomer seal is intended. In other words, the elastomer seal of the invention is used for mounting cylindrical devices in which the cylinder's radius need not be equal to the radius of the cylindrical sealing surface of the elastomer seal.

The elastomer seal according to the invention will properly seal housing cylinders having a radius of curvature several times the radius of the sealing surface. For example, housing cylinders of 30-43 mm diameter may be sealed by a sealing surface of about 12.5 mm, thus generating a housing cylinder radius: sealing surface radius ratio of about 1.2 to 1.7. That same radius (12.5 mm) will also seal cylinders of 30-43 mm diameters for a ratio of 1.6 to 2.5 and cylinders of 60-160 mm diameter for a sealing ratio of 2.4 to 6.4. Thus, the inventive seal can seal housing cylinders having radii from 1-6.4 times the sealing surface curvature radius. Of course, other sealing surface radii may be used to further and proportionally expand the range of housing cylinders which may be sealed by the invention.

In a preferred embodiment, the ratio of the base dimensions of the bottom, flat surface to the cylindrical sealing surface is 1.0 to 1.4, preferably 1.1 to 1.3 and in particular 1.2. The "base dimension" of the curved surface is the linear distance between the intersections of the curved surface and the lateral edges of the seal. This distance is a chord across the curved surface. For a seal with a bevelled transition surface, the measurement would go from bevel tip to bevel tip. On conventional seals, the "base dimension" would extend across the flat top from lateral edge to lateral edge.

It is especially advantageous to have an angled transition surface between the cylindrical and the lateral edge surfaces. This angle should be 20° to 40°, preferably 25° to 35°, and in particular 30° as measured from an axis parallel to the flat surface. This angled surface is designed to form tapering lateral surfaces which decrease the thickness of the elastomer in the transition from curved to lateral surfaces. With angular dimensions according to this form of embodiment, a particularly good and reliable compression of the elastomer seal is obtained in the outer areas as well as for sealing.

It is further advantageous to mold a sealing lip onto the cylindrical sealing surface. This sealing lip provides an additional measure of sealing confidence and integrity.

The sealing lip should preferably be molded directly along the entire edge of the cylindrical sealing surface or spaced apart slightly inside from the edge. The sealing lip according to this embodiment can also be characterized as a bead which forms a closed rectangle around the sealing surface. If the radius of the cylindrical sealing surface is smaller than the radius of the cylinder to be sealed, the pressure at the edge of the elastomer seal is high. The additional sealing effect from the lip is therefore higher when the lip is near the edge than if it is located further away from the edge.

The elastomer seal according to the invention is particularly suitable for sealed mounting of plug connectors for electrical connections. They are also useful for passages on other devices, machines or installations if the parts to be applied have insufficient or no flat surfaces for mounting. Elastomer seals of the invention may also be used in combination with hydraulic, pneumatic, and electromagnetic devices, such as magnetic valves, pressure transducers, limit scanners, proximity switches, flow vanes, level indicators, etc. These seals are also useful for "nonmetal" housings, such as those used in the chemical industry, e.g. glass.

BRIEF DESCRIPTION OF THE DRAWINGS

The invention will become more apparent from the examples with reference to the drawing. In the drawings:

FIG. 1 shows a top view of the invention,

FIG. 2 represents a cross section along the line II—II of FIG. 1,

FIG. 3 depicts a perspective view of the form of embodiment shown in FIGS. 1 and 2, FIG. 4 illustrates an alternative embodiment of the invention in a view similar to a cross section taken along line II—II of FIG. 1.

FIG. 8 depicts a 20 to 40 degree range of angles for the bevelled transition surface.

FIGS. 9 and 10 illustrate the reference points for measuring base dimensions on seals of the prior art and an embodiment of the instant invention.

DETAILED DESCRIPTION OF THE DRAWINGS

Seal 1 in FIGS. 1 to 3 and 11 may be made of a nitrile-butadiene rubber or a silicone rubber and having flat sealing surface 2, which is shown as rectangular with rounded edges. A center hole 3 is provided for screw fastening, and lateral holes 4 are for connecting pin and conduits. Lateral holes 4 may be used for a connector pin and three conduits or other connections as needed. One example of a different configuration for lateral holes 4 is shown in FIG. 4 with lateral holes 4' which would be located along line II—II of FIG. 1.

Figure 11:
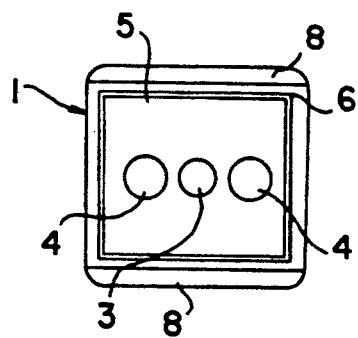
FIG. 11 shows a planar view of the curved surface.

The sectional drawing shown in FIG. 2 shows flat sealing surface 2 on the bottom side and a cylindrical sealing surface 5 on the top with sealing lip 6 spaced slightly apart from the outer edge of the cylindrical sealing surface, as seen more clearly in the perspective view of FIG. 3 and planar view of FIG. 11. Lateral surfaces 7 of the elastomer seals are substantially perpendicular to the flat sealing surface in the embodiment shown.

In contrast to conventional seals, cylindrical sealing surface 5 is adjacent a bevelled surface 8 (representing a transition surface between the cylindrical and lateral edge surfaces). In this manner, the thickness of the elastomer seal is reduced in the outer areas whereby the deformability is improved and the elastomer seal is able to seal a wide range of different cylinder surfaces.

FIG. 4 shows an example of how an instrument plug connector 10 is mounted using an elastomer seal according to the invention. In this depicted embodiment, the plug connector is attached to the flat sealing surface 2 of the seal; the plug has four connecting contacts. Center contact 15 passes through the elastomer seal and will protrude into the device to be sealed and connected. A mating connector will attach to plug end 16. Exemplary applications for this connection include using the seal to mount the plug connection for a magnetic valve or a pressure transducer.

The mode of operation of the elastomer seal will be explained below with reference to FIGS. 5 to 7.

Figure 5:
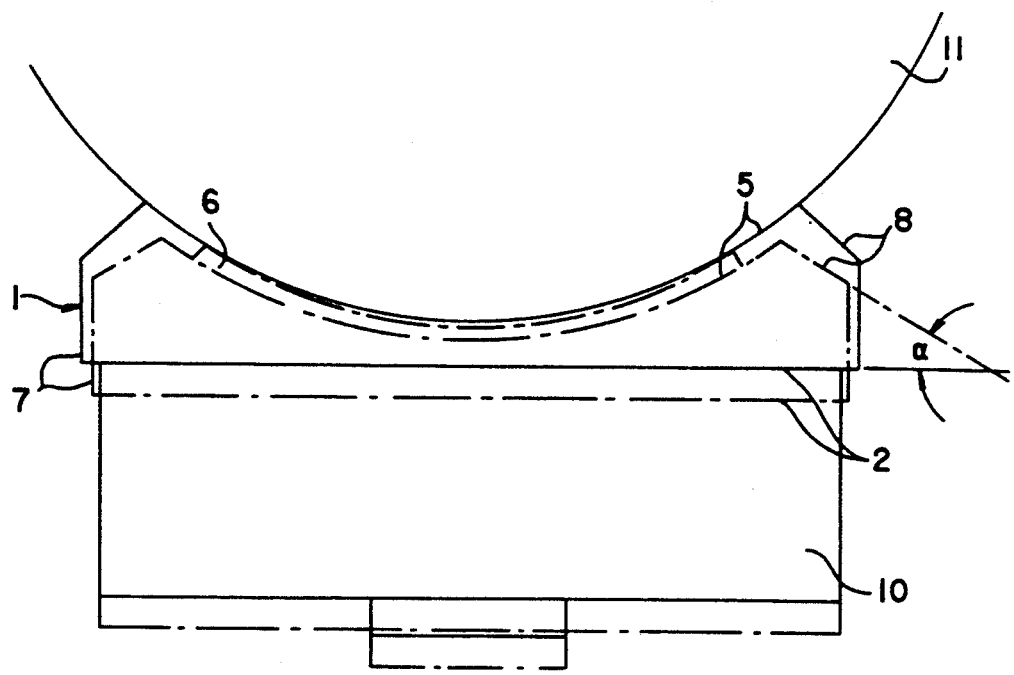
FIG. 5 presents a schematic view of an elastomer seal according to the invention, having radius for the cylindrical sealing surface equal to the cylindrical radius of the cylindrical housing, also shown schematically.

As seen in FIG. 5, elastomer seal 1 is located between plug connector 10 and cylindrical housing 11. The position of plug connector 10 and the form of elastomer seal 1 are shown in the uncompressed state by broken lines and in the compressed state by solid lines. Tightening plug connector 10 against housing 11 will cause the seal to compress.

As further seen in FIG. 5, the radius of cylindrical housing 11 is essentially identical to that of the uncompressed elastomer seal 1 so that sealing lip 6 rests substantially uniformly on cylinder housing 11. As seen from the solid lines, during compression sealing lip 6 completely compresses and seal 1 is radially deformed until it conforms to the curvature of housing 11.

The bevel angle, alpha, is measured between a plane parallel to flat sealing surface 2, and the bevelled surface 8 representing the transition between cylindrical surfaces 5 and flat sealing surface 2. The embodiment shown in FIG. 5 uses a bevel angle of 30°. This angle has been found to form an advantageous balance between structural rigidity and effective sealing.

Figure 6:
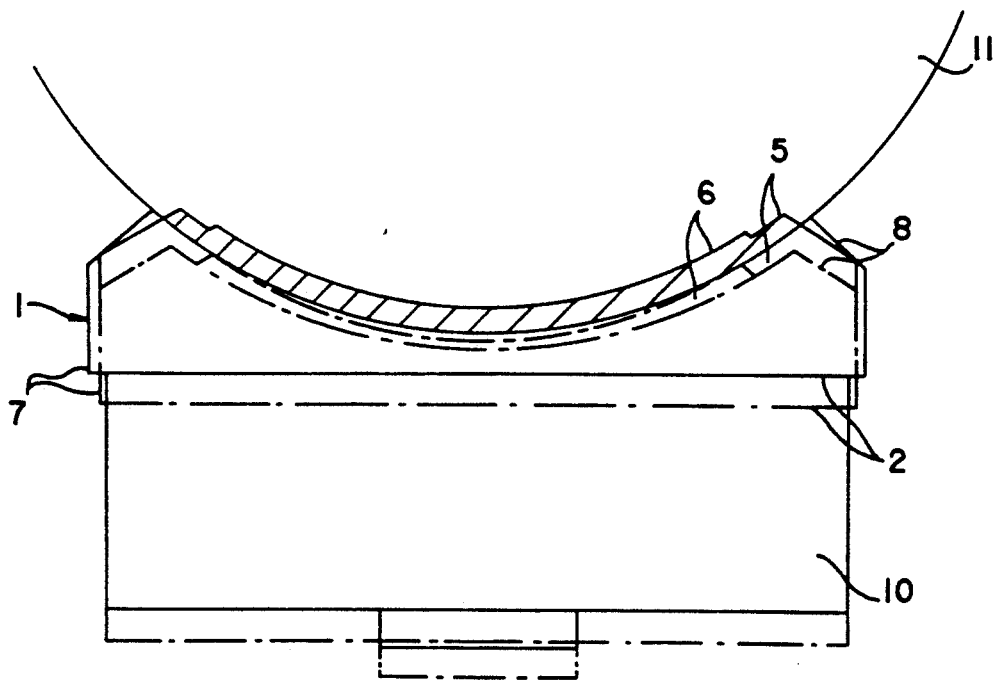
FIG. 6 is the embodiment shown in FIG. 5 in the compressed state.

FIG. 6 corresponds to FIG. 5 although the position of elastomer seal 1 is additionally shown in the compressed state in a manner such as if elastomer seal 1 would not have been altered in its shape. This results in the shaded surface representing the volume of the elastomer seal "displaced" on the cylinder housing during the compression.

Figure 7:
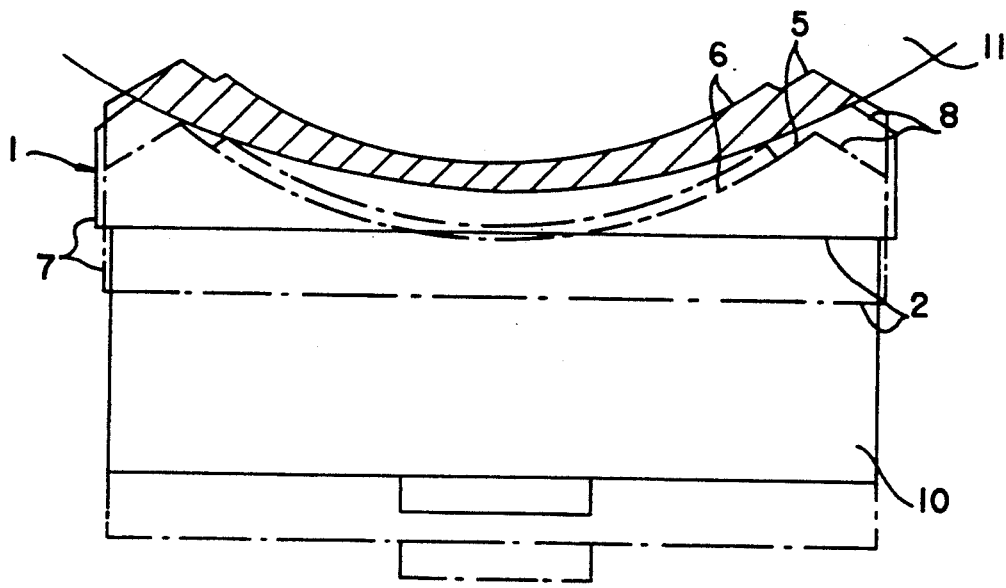
FIG. 7 depicts the views corresponding to FIGS. 5 and 6, in which the radius of the cylindrical sealing surface of the elastomer seal is smaller than the radius of the cylinder to be sealed.

FIG. 7 shows an elastomer seal 1 according to the invention in combination with a cylinder housing 11. The cylinder radius is, however, larger than the radius of cylindrical sealing surface 5 of elastomer seal 1 according to the invention.

In FIG. 7, the position of plug connector 10 and of the elastomer seal 1 in the uncompressed state are again shown by dash-and-dot lines. The radius of cylindrical sealing surface 5 in this case is appreciably smaller than the radius of the cylinder housing 11.

Corresponding to FIG. 6, the position of elastomer seal 1 in the compressed state is drawn in with continuous lines and as if the elastomeric mass would not have been displaced by the compression process. This again yields a shaded surface corresponding to the volume "displaced" during the compression process.

The principle of the invention becomes apparent from FIG. 7. Good compression and sealing are present in the center part of the elastomer seal as indicated by the shaded surface in the center of the elastomer seal 1. The thickness of the shaded surface is a measure of the compression pressure and thus of the sealing over the entire sealing surface. The thickness of the shaded surface and, thus, the compression pressure is somewhat heavier toward the seal edges compared to the center. The difference is not so different, though, that the sealing function would be impaired in any location.

In conventional seals, the large thickness at the edge of the seal results in little center sealing with most of the pressure at the edges. This distribution produces a seal integrity vulnerability point whereby any break in the periphery breaches the entire seal. Good center sealing results in a higher seal integrity.

The invention has been explained herein by means of preferred example of embodiment. However, numerous variants and layouts are possible for those skilled in the art from reading this description without exceeding the concept of the invention.

I claim:

1. An elastomer seal comprising:
   a flat sealing surface having a first base dimension and being located on a first side of said seal,
   a curved sealing surface having a second base dimension and being disposed on a side of said seal opposite said flat sealing surface,
   a lateral surface substantially perpendicular to said flat sealing surface,
   a flat, laterally non-captivating connector abutting said flat sealing surface; and
   a transition surface adjacent said curved sealing surface; wherein said second base dimension is less than said first base dimension.

2. An elastomer seal according to claim 1 wherein the ratio of said first base dimension to said second base dimension is 1.05 to 1.4.

3. An elastomer seal according to claim 2 wherein said ratio is 1.1 to 1.3.

4. An elastomer seal according to claim 3 wherein said ratio is 1.2.

5. An elastomer seal according to claim 1 wherein said curved sealing surface further comprises a sealing lip bordering a perimeter of said curved sealing surface.

6. An elastomer seal according to claim 5 wherein said sealing lip is molded onto said curved sealing surface at a distance from where said curved surface meets said transition surface.

7. An elastomer seal according to claim 1 wherein said transition surface is at an angle from a plane parallel to said flat sealing surface.

8. An elastomer seal according to claim 7 wherein said angle is 20 to 40 degrees.

9. An elastomer seal according to claim 8 wherein said angle is 25 to 35 degrees.

10. An elastomer seal according to claim 9 wherein said angle is 30 degrees.

11. In combination with a curved housing having a first radius of curvature, an elastomeric seal comprising:
    a flat sealing surface on one side of said elastomeric seal,
    a lateral surface substantially perpendicular to said flat sealing surface,
    a flat, laterally non-captivating connector abutting said flat sealing surface,
    a curved sealing surface having a second radius of curvature that is less than or equal to said first radius of curvature, said curved sealing surface being disposed on a side of said seal opposite said flat sealing surface, and
    an angled transition surface adjacent said curved sealing surface.

12. A combination as in claim 11 wherein said first radius of curvature is up to and including 6.4 times said second radius of curvature.

13. A combination as in claim 11 wherein said curved sealing surface further comprises a sealing lip.

14. A combination as in claim 13 wherein said lip is spaced at a distance from where said curved sealing surface meets said angled transition surface.

15. A combination as in claim 11 wherein said angled transition surface comprises a bevel at an angle of 20 to 40 degrees measured from a plane parallel to said flat sealing surface wherein the bevel tapers toward said curved sealing surface.

16. A combination as in claim 15 wherein said bevel is at a 25 to 35 degree angle.

17. A combination as in claim 16 wherein said bevel is at a 30 degree angle.

18. A method for forming a sealed, flat mounting surface on a curved housing having a first radius of curvature with an elastomeric seal, said elastomeric seal comprising:
    a flat sealing surface on one side of said seal,
    a lateral surface substantially perpendicular to said flat sealing surface,
    a flat, laterally non-captivating connector abutting said flat sealing surface,
    a curved sealing surface having a second radius of curvature that is less than or equal to said first radius of curvature, said curved sealing surface being disposed on a side of said seal opposite said flat sealing surface, and
    an angled transition surface adjacent said curved sealing surface;
    said method comprising:
    contacting said curved housing with said curved sealing surface on said elastomeric seal,
    forcing said curved housing against said curved sealing surface, and
    deforming said curved sealing surface to correspond to said first radius of curvature and form a sealed area between central and peripheral areas of said curved sealing surface and said curved housing.

19. A method according to claim 18 further comprising increasing said size and distribution of said sealed area by forming said angled transition surface at a 20 to 40 degree angle as measured from a plane parallel to said flat sealing face and forming a tapered thickness in said elastomeric seal between said transition surface and said curved sealing surface.

20. A method according to claim 18 further comprising increasing the size and distribution of said sealing area by forming a sealing lip onto said curved sealing surface.

21. A method according to claim 20 further comprising increasing the size and distribution of said sealing area in a central portion of said area by forming a sealing lip onto said curved sealing surface at a distance from where said curved sealing surface meets said angled transition surface.

22. An elastomer seal comprising:
    a flat sealing surface having a first base dimension and being located on a first side of said seal;
    a curved sealing surface having a second base dimension and being disposed on a side of said seal opposite said flat sealing surface;
    a lateral surface substantially perpendicular to said flat sealing surface; a flat laterally non-captivating connector abutting said flat sealing surface;
    a transition surface adjacent to said curved sealing surface; wherein said second base dimension is less than said first base dimension; and
    a protruding sealing lip circumscribing and disposed on said curved sealing surface.

23. An elastomer seal according to claim 22 wherein said sealing lip is spaced from an external perimeter of said curved sealing surface.

24. An elastomer seal according to claim 23 wherein said seal defines at least two holes running between said flat sealing surface and said curved sealing surface.

* * * * *